Dec. 18, 1951 F. H. GARDNER 2,579,069

FREQUENCY RESPONSE CONTROLLING MEANS

Filed June 4, 1948 2 SHEETS—SHEET 1

INVENTOR.
FREDERICK H. GARDNER
BY J. L. Bowes
ATTORNEY

Dec. 18, 1951 F. H. GARDNER 2,579,069

FREQUENCY RESPONSE CONTROLLING MEANS

Filed June 4, 1948 2 SHEETS—SHEET 2

INVENTOR.
FREDERICK H. GARDNER
BY J. L. Bowes
ATTORNEY

Patented Dec. 18, 1951 2,579,069

UNITED STATES PATENT OFFICE 2,579,069

FREQUENCY RESPONSE CONTROLLING MEANS

Frederick H. Gardner, Rochester, N. Y., assignor to Stromberg-Carlson Company, a corporation of New York Application June 4, 1948, Serial No. 31,167

6 Claims. (Cl. 178—44)

My invention relates to frequency response controlling means whereby the frequency response of an audio amplifier may be adjustably controlled or varied.

In order to permit the user of an amplifier to adjust the frequency response of the sound reproduced by the amplifier according to his individual preferences or to accommodate peculiar local conditions, it is desirable to provide tone control means. Accordingly, it is an object of my invention to provide new and improved tone control means according to which both treble and bass portions of the reproduced sound may be controlled.

Figure 1:
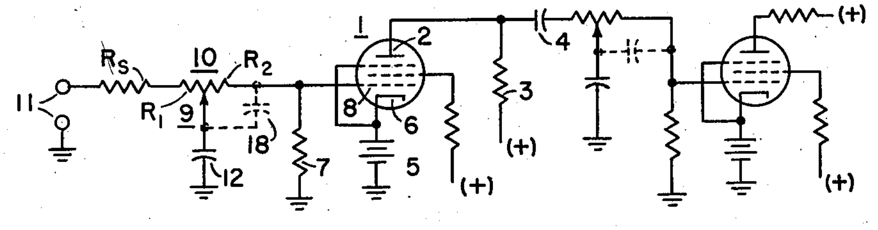
Figure 2:
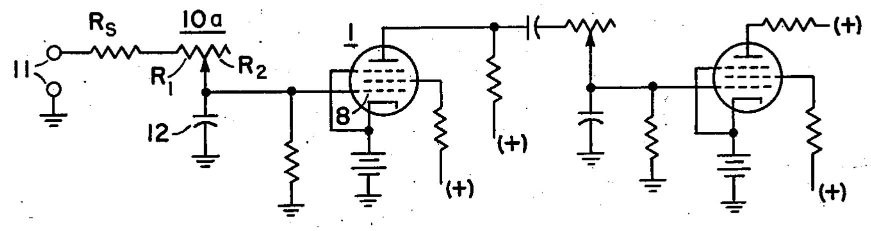
Figure 3:
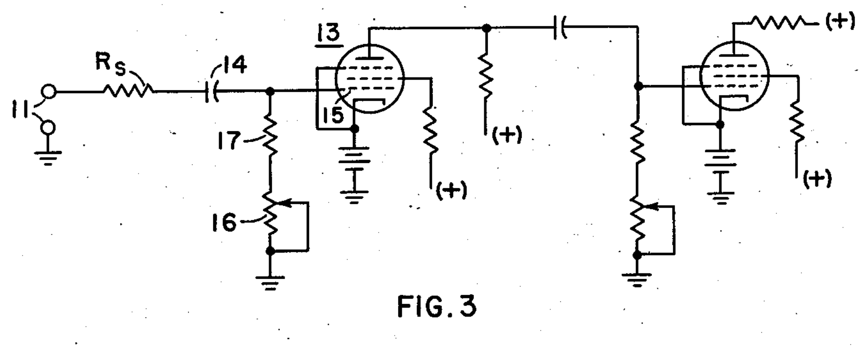
Figure 4:
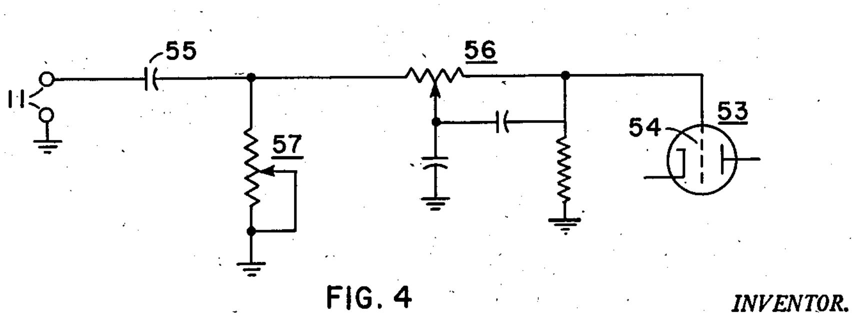
Figure 5:
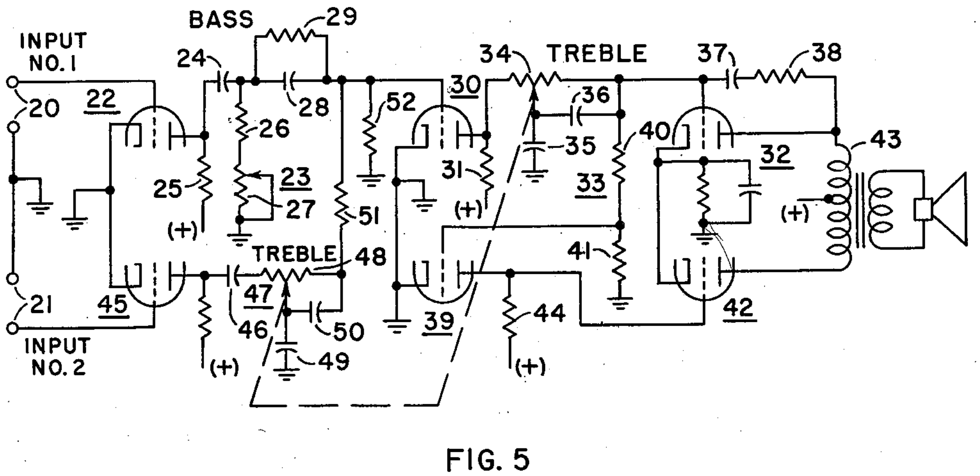
Figure 6:
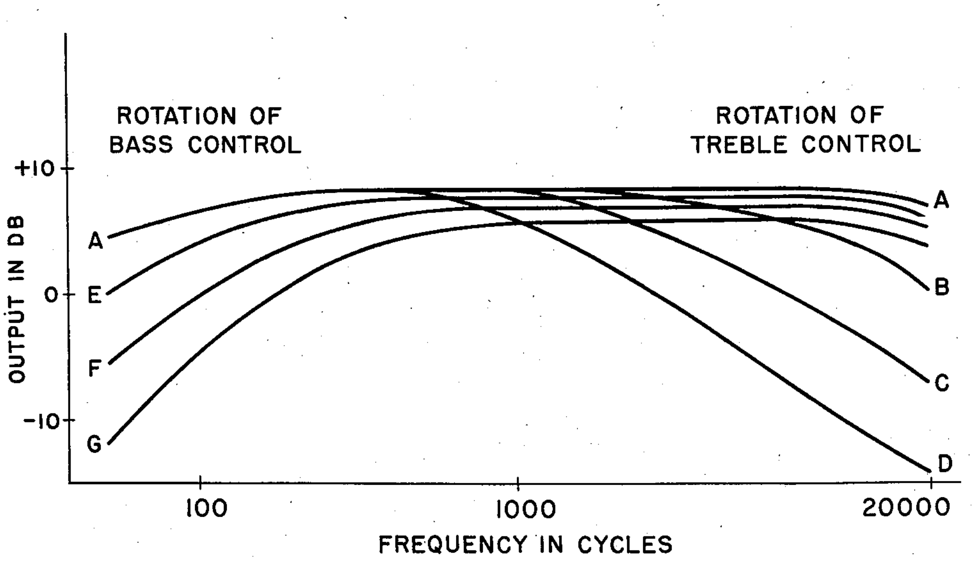

Other objects and advantages of my invention will become apparent as the following description proceeds, and the features of novelty which characterize my invention will be pointed out with particularity in the claims annexed to and forming a part of this specification. For a better understanding of my invention, reference may be had to the accompanying drawing in which Figs. 1 and 2 illustrate different embodiments of my invention utilizing frequency control of the relatively high frequency components of the signals being reproduced; Fig. 3 illustrates an embodiment of my invention according to which the lower frequencies are controlled; Figs. 4 and 5 illustrate amplifiers provided with both bass and treble control; and Fig. 6 is a family of curves useful in understanding the principles of my invention.

In accordance with my invention, I contemplate the application of bass or treble, or both, controls to at least one stage of an audio amplifier. My invention may precede the first stage or be inserted between stages or a combination of locations may be employed. The invention comprises in one embodiment, for example, an electron discharge device having input and output circuits. The treble control includes resistance in one side of the input circuit and a capacitance across the input circuit, one side of the capacitance being preferably adjustably connected to the resistance. The base control comprises a variable resistance shunting the input circuit of one of the stages of the amplifier and a capacitor connected in one side of the input circuit on the input side of the variable resistance. Referring to the drawing, Fig. 1 shows in schematic form a portion of an amplifier provided with tone control means which makes possible the variation of the high frequency response by varying the high frequency cutoff point for the network. Two stages of control are shown in order to illustrate the application of two stages, although only one stage or more than two stages may be used if desired.

The first stage illustrated in Fig. 1 comprises an electron discharge device 1 of suitable type, illustrated in the drawing as being one of the pentode type. The anode 2 is connected to a suitable source of positive potential as through a suitable resistor 3 and to the next stage of the amplifier through a suitable coupling capacitor 4. The discharge device 1 is biased in some suitable manner. In the illustrated embodiment of my invention, there is provided a suitable source of direct current potential 5 connected between the cathode 6 and ground. The input or grid circuit is completed through a suitable resistor 7 connected between ground and control electrode or grid 8 of device 1.

Means is provided to vary the point of high frequency cut-off. In Fig. 1, this means comprises a suitable tone control 9 which may include a potentiometer 10 connected between a suitable source of input signal as indicated by the terminals 11 and the control electrode 8 and a suitable capacitor 12 connected between the arm of the potentiometer 10 and a point of predetermined potential, such as ground. There is also represented in series with the potentiometer 10 a resistor $R_s$. $R_s$ represents the resistance of the source of the input signal, i. e., the resistance of the system preceding the tone control resistance or potentiometer 10.

The second stage of tone control is the same as that illustrated in the first stage as will be apparent from a comparison of the left and right hand portions of Fig. 1.

It will be understood that the principles of my invention are not limited to the use of a potentiometer. For example, in Fig. 2, there is illustrated a modification of the arrangement of Fig. 1 in which a conventional variable resistor 10a is substituted for the potentiometer 10. The control electrode 8 in this embodiment of my invention is connected to the variable point of the resistor, as by connection to a tap or to a movable arm, as shown, instead of to the righthand end of potentiometer 10 of Fig. 1. In Fig. 2, components identical to those illustrated in Fig. 1 are represented by the same numerals as used in Fig. 1.

In order to describe the theory of operation of the treble tone control disclosed herein, it is assumed that $R_s$ is the resistance of the source of input, $R_0$ is the load on the tone control network, i. e., the input resistance of discharge device 1, $R_1$ is the amount of resistance of potentiometer 10 on the input side of the arm of potentiometer 10, $R_2$ is the amount of resistance on the output side of the arm of potentiometer 10, C is the capacity of capacitor 12, and $X_c$ is the capacitive reactance of capacitor 12. In this connection, reference is made to the curves of Fig. 6. The right hand side of Fig. 6 shows the effect of different settings of potentiometer 10 on the output level expressed in decibels vs. frequency. Curve A represents the condition when the arms of potentiometer 10 is at the extreme left as viewed in Fig. 1, i. e., $R_1$ is equal to zero, curve D represents a condition in which the potentiometer arm is at the extreme right as viewed in Fig. 1, i. e., $R_1$ is maximum and $R_2$ is equal to zero, and curve B and C represent intermediate positions of the potentiometer.

Inspection of Fig. 1 indicates that $R_s$, potentiometer 10 and capacitor 12 constitute a voltage divider. Then, if $R_0$ is much greater than $R_s$ and if $R_s$ is small with respect to the reactance of capacitor 12 for the highest frequency to be passed (a condition which is met when the capacity of the capacitor 12 is small), and $R_1$ is equal to zero, most of the signal voltage appears across capacitor 12. If cutoff be considered that level at which attenuation attains 3 db, the pass band of the circuit shown in Fig. 1 under the conditions assumed (curve A of Fig. 6) is approximately 50 cycles to something in excess of 20,000 cycles. The high frequency cutoff point (where the output voltage $E_0$ is reduced to a value 3 db below full output) is the point where $X_c$ is equal to the sum of $R_s$ and $R_1$. Since C and $R_s$ are fixed, the high cutoff point may be controlled by adjusting potentiometer 10 to vary $R_1$ whereby the range of control depends on the total resistance of the potentiometer ($R_1$ and $R_2$) and the capacitance of capacitor 12.

If potentiometer 10 is moved to the other extreme, $R_1$ becomes maximum and $R_2$ becomes zero in which case the resistance on the input side of the arm of the potentiometer increases by an amount $R_1$ and hence less voltage drop exists across capacitor 12. Referring to Fig. 6, the cutoff level is now reached at approximately 1100 cycles.

When a plurality of stages of control are used, the plate resistance of all electron discharge devices except the last and the anode resistors associated therewith should be of relatively low resistance compared to $R_1$ and $R_2$ and the control electrode or grid resistors should be of relatively high value with respect to the sum of $R_1$ and $R_2$ in order to provide a relatively high impedance and relatively little voltage drop across potentiometer 10.

By providing a plurality of stages as shown in Figs. 1 and 2, there results sharper attenuation characteristics and there is illustrated treble control on the input side of a stage as well as treble control between two stages of an audio amplifier.

In some cases, it may be desirable to include a suitable capacitor 18 in shunt with the right hand portion of potentiometer 10, as indicated in dotted lines in Fig. 1, as, for example, when tubes of the triode type are used, or where it is desired to compensate for any high frequency losses resulting from the use of shielded leads.

Referring to Fig. 3, there is illustrated two stages of amplification embodying bass control or means for varying the low frequency cut-off of the amplifier. The arrangement disclosed in Fig. 3 comprises a suitable electron discharge device 13 illustrated as of the pentode type connected to a suitable source of input signal 11 through a suitable capacitor 14 and resistance $R_s$ representing the resistance of the source. Between the control electrode 15 of electron discharge device 13 and ground, there is connected a suitable variable resistance 16 and a fixed resistance 17, although if preferred, a single potentiometer or resistor, variable in nature, may be provided. With this arrangement, capacitor 14 is on the input side of resistances 16 and 17 and the arm of the potentiometer or resistance 16 is connected to ground so that the lower portion, as viewed in Fig. 3, is shortcircuited. With this arrangement, capacitor 14 and resistors 16 and 17 constitute a resistance-capacitance network. Again, cutoff may be considered to be the frequency where attenuation reaches a loss of 3 db. Under this condition, if $R_s$ is much less than the value of resistance of resistor 17, the low frequency cut-off point is that frequency where the capacitive reactance of capacitor 14 is equal to the sum of resistances 16 and 17.

Referring to Fig. 6, the left hand portion of the figure illustrates various conditions for different settings of the bass control of resistor 16. Assuming that the treble control illustrated in Figs. 1 and 2 is in the position for curve A, curve G is then representative of the condition wherein resistance 16 is equal to zero. At this point, the capacitive reactance of the coupling capacitor 14 is equal to the resistance of resistor 17 and the low frequency cut-off point is approximately 250 cycles. If the setting of potentiometer 16 is varied so that all of its resistance is inserted in circuit, the response is indicated by curve A in Fig. 6 and the cut-off frequency becomes approximately 50 cycles. Figs. 6E and 6F represent intermediate settings of control 16 with cut-off frequencies of approximately 95 and 175 cycles, respectively. The range of control depends upon the values of capacity of capacitor 14 and the amount of resistance included in $R_s$ and resistors 16 and 17.

Fig. 4 shows a single stage amplifier embodying both bass and treble controls of the type shown in Figs. 1 and 3, respectively. There is illustrated an electron discharge device 53. Input signals are applied to the control electrode 54 of device 53 through a suitable first capacitor 55 and treble control element 56, capacitor 55 being connected on the input side of potentiometer or resistance 56. Bass control is had by means of bass control section 57 connected from a point between capacitor 55 and potentiometer 56 and the other side of the input circuit.

In Fig. 5 there is illustrated a complete amplifier embodying the principles discussed hereinbefore. There are illustrated two pairs of input terminals 20 and 21 which may, for example, be suitably arranged for microphone and phonograph, respectively. Input terminal 20 is shown connected to the control electrode of a suitable electron discharge device 22 which may be one half of a type 6SC7 tube. The output of electron discharge device 22 is impressed across the bass control section 23 including a suitable capacitor 24 and resistances 26 and 27, and the anode of device 22 is also connected to a suitable source of direct current through a suitable anode resistor 25.

The output of the bass control section may be connected through a suitable capacitor 28 shunted by a suitable resistor 29 to compensate for any high frequency losses in other parts of the amplifier to the control electrode of an electron discharge device 30 which may be one half of a type 6SC7 tube, although in most cases capacitor 28 and resistor 29 may be omitted. The anode discharge device 30 is connected to a suitable source of positive potential through a suitable anode resistor 31 and to the control electrode of the next stage 32 of the amplifier, which may be one half of a type 6N7 tube, through a treble control section 33 comprising a potentiometer 34 connected in series with the anode of discharge device 30 and device 32, and a capacitor 35 is connected between the arm of potentiometer 34 and ground. Capacitor 36 is connected between the arm of potentiometer 34 and the output end of the resistance portion of potentiometer 34. The output of discharge device 32 is connected to a suitable output transformer 43. Feedback, if desired, may be provided as by means of series connected capacitor 37 and resistor 38 connected between anode and control electrode of device 32. The output side of treble control 33 is also connected to the control electrode of a suitable discharge device 39 which may be the other half of the second-mentioned type 6SC7 tube through a suitable coupling resistor 40. The control electrode of device 39 is also connected to ground through a suitable resistor 41. The anode of device 39 is connected to a suitable source of positive potential through anode resistor 44 and to the control electrode of a suitable discharge device 42 which may be the other half of the type 6N7 tube. The anode of discharge device 42 is connected to the output transformer 43.

The second pair of input terminals 21 is shown connected to the control electrode of discharge device 45 which may be the other half of the first-mentioned type 6SC7 tube. The output of device 45 is impressed across treble control section 47 through a suitable coupling capacitor 46. The treble control section 47 comprises a potentiometer 48 and a capacitor 49 connected between the arm of the potentiometer and ground. Inasmuch as a tube of the triode type is employed, capacitor 50 is connected between the arm of the potentiometer 48 and the right hand end of potentiometer 48 as viewed in Fig. 5. The output side of treble section 47 is connected to the control electrode of discharge device 30 through a suitable coupling resistor 51. The control electrode of device 30 is also connected to ground through a suitable resistor 52. Treble sections 33 and 47 may be arranged for simultaneous adjustment as indicated by the dashed lines in Fig. 5.

Typical values for the various components of the amplifier illustrated in Fig. 5 are as follows:

Devices 22 and 45, type 6SC7 tube
Devices 30 and 39, type 6SC7 tube
Devices 32 and 42, type 6N7 tube
Resistor 25, 22,000 ohms
Resistor 26, 47,000 ohms
Resistor 27, 5 megohms
Resistor 29, .47 megohm
Resistor 31, 22,000 ohms
Resistor 34, .25 megohm
Resistor 38, 4.7 megohms
Resistor 40, .33 megohm
Resistor 41, 10,000 ohms
Resistor 44, 47,000 ohms
Resistor 48, .25 megohm
Resistor 51, .15 megohm
Resistor 52, .22 megohm
Capacitor 24, .01 microfarad
Capacitor 28, 50 micro microfarads
Capacitor 35, 1000 micro microfarads
Capacitor 36, 150 micro microfarads
Capacitor 37, .1 microfarad
Capacitor 46, .1 microfarad
Capacitor 49, 470 micro microfarads
Capacitor 50, 150 micro microfarads While I have shown and described a particular embodiment of my invention, it will be obvious to those skilled in the art that changes and modifications may be made without departing from my invention in its broader aspects. For example, my invention is also applicable to push-pull amplifiers. I, therefore, aim in the appended claims to cover all such changes and modifications as fall within the true spirit and scope of my invention.

I claim:

1. In an audio amplifier, an electron discharge device having input and output circuits, means for impressing signals to be amplified on said input circuit, means for varying the high frequency cut-off point of said signals comprising a potentiometer connected in series in one side of said input circuit and a first capacitor connected between the arm of said potentiometer and the other side of said input circuit, and means for varying the low frequency cut-off point of said signals comprising a second capacitor connected on the input side of said potentiometer and a variable resistance connected from a point between said second capacitor and said potentiometer and the other side of said input circuit.

2. In an audio amplifier, an electron discharge device having input and output circuits, means for impressing signals to be amplified on said input circuit, means for varying the high frequency cut-off point of said signals comprising a potentiometer connected in series in one side of said input circuit and a first capacitor connected between the arm of said potentiometer and the other side of said input circuit, means for varying the low frequency cut-off point of said signals comprising a second capacitor connected in series with said potentiometer on the input side thereof and a variable resistance connected from a point between said second capacitor and said potentiometer and the other side of said input circuit, and a third capacitor connected between the arm of said potentiometer and the output side of said potentiometer.

3. In an audio amplifier, an electron discharge device having an anode, a cathode, and a control electrode; an output circuit between said anode and said cathode; an input circuit between said control electrode and said cathode; means for impressing signals to be reproduced on said input circuit; a second electron discharge device having an anode, a cathode, and a control electrode; means for impressing signals appearing in the output circuit of said first electron discharge device upon the control electrode of said second electron discharge device; means including a first capacitor and a resistance connected in series with the control electrode of said second electron discharge device, said first capacitor being connected on the input side of said series resistance, and a second capacitor adjustably connected to a point of said resistance and a point of predetermined potential, whereby the high frequency cut-off is adjustable; and a variable resistance connected from a point between said first capacitor and said series resistance to said point of predetermined potential whereby the low frequency cut-off is adjustable.

4. In an audio amplifier, an electron discharge device having an input circuit and treble tone control means in said input circuit comprising a single series connected resistance in one side of said input circuit and a shunt connected capacitor, one terminal of said capacitor being adjustably connected to said resistance, and the other terminal of said capacitor being directly connected to the other side of said input circuit, whereby the high frequency cutoff point of said amplifier is adjustable.

5. In an audio amplifier, a pair of electron discharge devices, each having an anode, a cathode, and a control electrode, one of said devices having an output circuit connected between its anode and cathode thereof, the other of said discharge device having an input circuit connected between its control electrode and its cathode, means for varying the high frequency cut-off of signals being passed through said amplifier for reproduction comprising a capacitor connected to the anode of the first electron discharge device and a single series connected resistor connected between said capacitor and the control electrode of the second electron discharge device, and a second capacitor adjustably and directly connected between a point on said resistor and said cathode.

6. In an audio amplifier, an electron discharge device having an input circuit and treble tone control means in said input circuit comprising a single series connected resistance in one side of said input circuit and a shunt connected capacitor, one terminal of said shunt connected capacitor being adjustably connected to said resistance, the other terminal of said shunt connected capacitor being directly connected to the other side of said input circuit whereby the high frequency cut-off point of said amplifier is adjustable, and another capacitor connected between said one terminal and the output side of said resistance.

FREDERICK H. GARDNER.

REFERENCES CITED

The following references are of record in the file of this patent:

UNITED STATES PATENTS

| Number | Name | Date |
|---|---|---|
| 1,862,458 | Barstow | June 7, 1932 |
| 1,914,629 | Aguirre | June 20, 1933 |
| 2,037,285 | Tasker | Apr. 14, 1936 |

FOREIGN PATENTS

| Number | Country | Date |
|---|---|---|
| 152,127 | Austria | Dec. 27, 1937 |